United States Patent [19]

Feldman

[11] Patent Number: 4,631,540
[45] Date of Patent: Dec. 23, 1986

[54] ANGULAR POSITION TO LINEAR VOLTAGE CONVERTER

[75] Inventor: Alan Feldman, Phoenix, Ariz.

[73] Assignee: Sperry Corporation, New York, N.Y.

[21] Appl. No.: 740,602

[22] Filed: Jun. 3, 1985

[51] Int. Cl.$^4$ ............................................. G08C 19/04
[52] U.S. Cl. .................................. 340/870.38; 33/1 PT
[58] Field of Search ................... 340/870.38, 671, 672; 338/137; 33/1 PT; 307/3, 75, 120, 122

[56] References Cited

U.S. PATENT DOCUMENTS 2,396,244  3/1946  Borsum ...................... 340/870.38 X

FOREIGN PATENT DOCUMENTS 364083  10/1938  Italy ................................. 340/870.38

Primary Examiner—Jerry W. Myracle
Attorney, Agent, or Firm—Howard P. Terry

[57] ABSTRACT

An apparatus for converting angular position to a linear voltage. A continuous element dual wiper potentiometer provides triangular waveforms 90° apart to a waveform conversion circuit which generates a linear positive going ramp waveform in response to the angular position of the potentiometer wipers.

8 Claims, 1 Drawing Figure

2a

2b

2c

2d

2e

2f

ANGULAR POSITION TO LINEAR VOLTAGE CONVERTER

BACKGROUND OF THE INVENTION

1. Field of the Invention

The present invention relates to an apparatus for information transduction and more specifically to a circuit for converting angular position to a linear voltage.

2. Description of the Prior Art

Prior art solutions for converting angular position information to a linear voltage include closed loop servo systems with angular position information obtained from a synchro resolver. Other prior art systems have employed optical or electro-mechanical encoders to supply angular position information. Prior art systems used to data for converting angular position to linear voltage are generally complex, costly and occupy appreciable volume. An object of the present invention is to provide a simple, inexpensive and small apparatus where the synchro and its associated electronics is replaced with a dual wiper potentiometer and a simple linear conditioning circuit.

SUMMARY OF THE INVENTION

The present invention provides an apparatus for converting angular position to a linear voltage. Use is made of a low-cost continuous element, potentiometer having dual wipers positioned 90° apart. Equal and opposite polarity voltages are applied to the potentiometer 180 degrees apart. As the wipers of the potentiometer are rotated, two triangular waveshapes displaced 90 degrees from each other are generated. An operational amplifier configured as an inverter/buffer provides a sawtooth waveform to an operational amplifier configured as a summer where it is added to a constant voltage and a periodic voltage such that the final output is a linear, positive ramp voltage representative of the angular position.

DESCRIPTION OF THE PREFERRED EMBODIMENT

Figure 1:
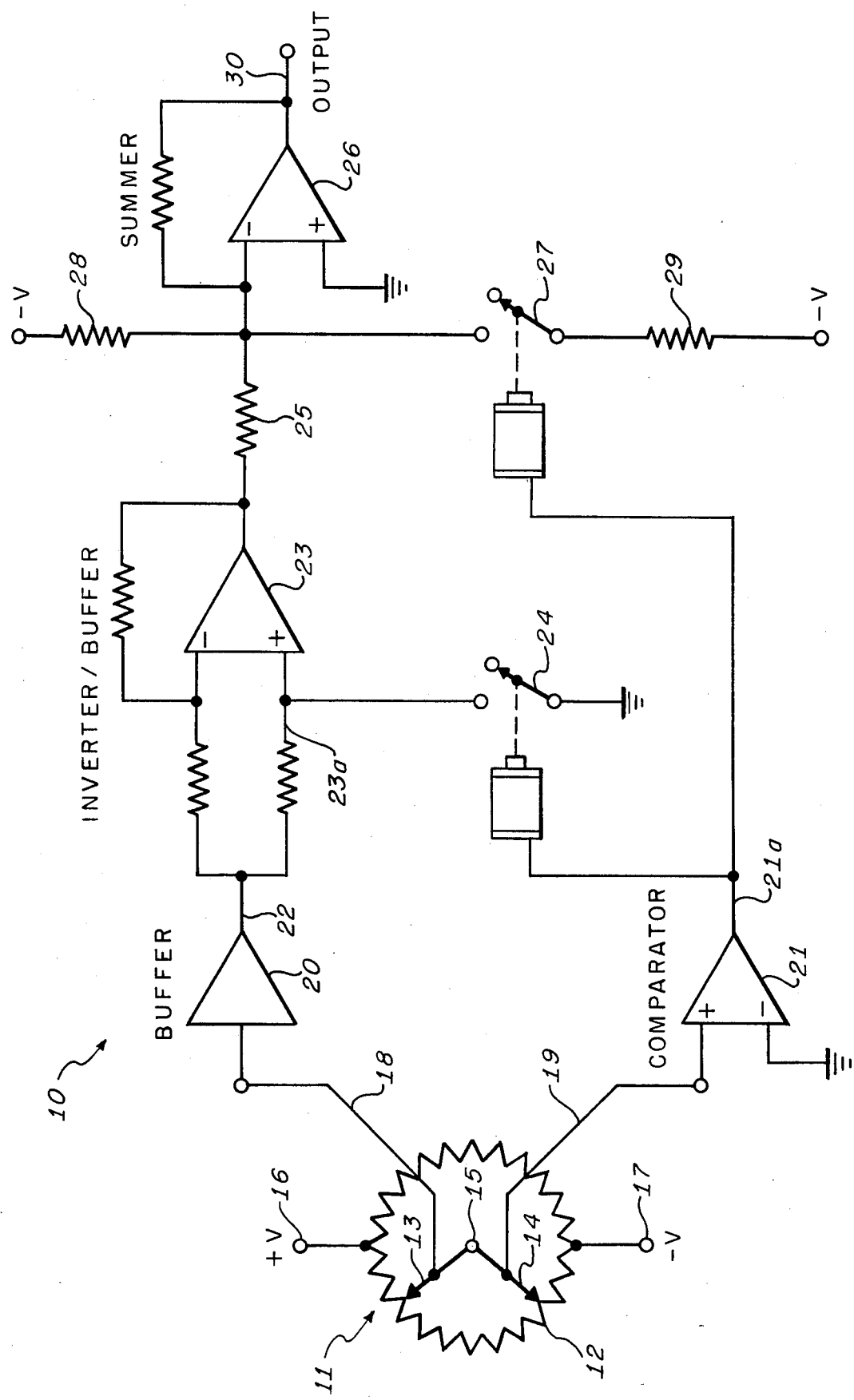
FIG. 1 depicts the circuit of the present invention.
Figure 2:
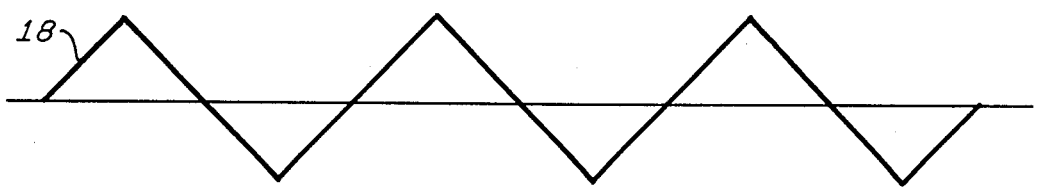
FIG. 2, including parts 2a-2f, illustrates the voltage waveforms at designated points in FIG. 1.
Figure 2:
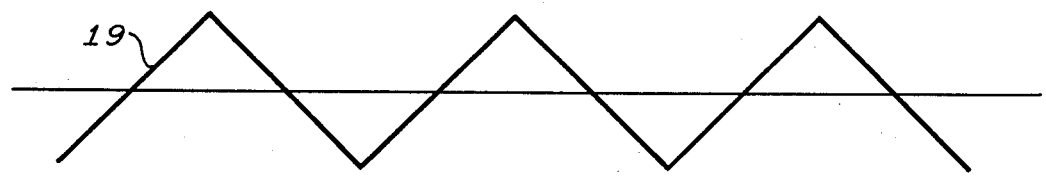
Figure 2:
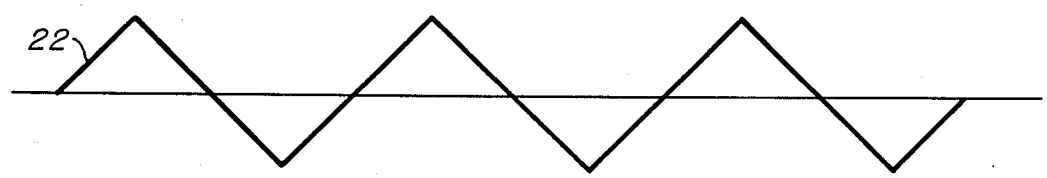
Figure 2:
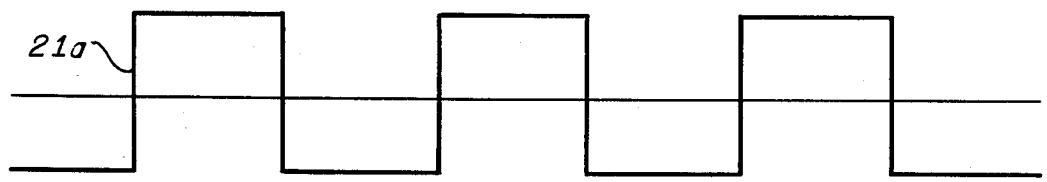
Figure 2:
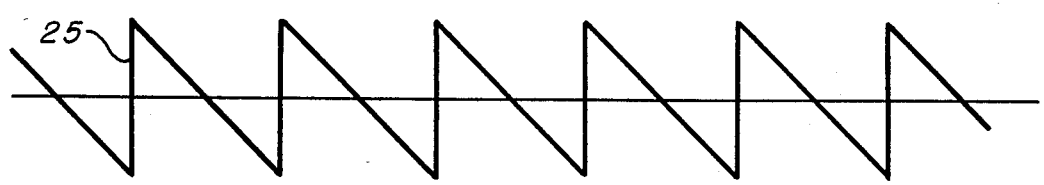
Figure 2:
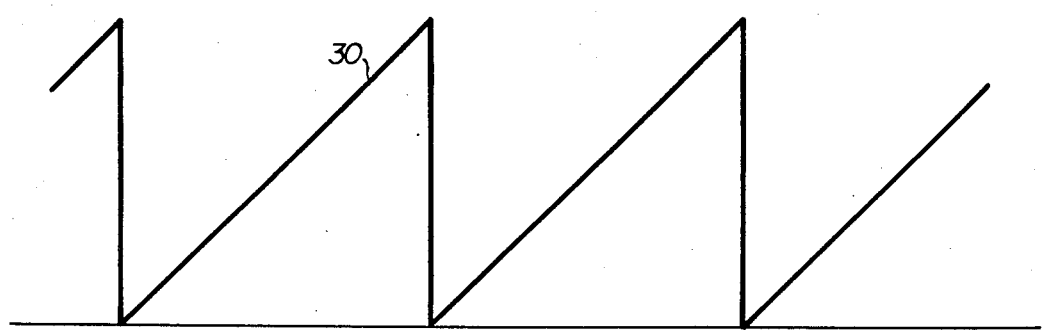

FIG. 1 illustrates the functional components of angular position to linear voltage converter 10. Dual-wiper potentiometer 11 consists generally of a continuous resistive element 12, wipers 13 and 14 positioned 90 degrees apart and rotated in the same direction by common shaft 15. D.C. voltages 16 and 17 of equal and opposite polarity are applied to opposite sides of resistive element 12. As shaft 15 is rotated, for example clockwise, periodic bi-polar triangular voltage waveforms 18 and 19, 90 degrees out of phase relative to each other, are applied to buffer 20 and comparator 21, respectively. Waveforms 18 and 19 are illustrated in FIG. 2a and 2b, respectively.

Buffer 20, typically an operational amplifier, prevents loading of input voltage waveform 18. The output of buffer 20 waveform 22 (depicted in FIG. 2c) is identical to the input waveform 18. Comparator 21 acts to prevent loading of input waveform 19 and provides a substantially square wave output waveform 21a, shown in FIG. 2d, that is positive when input waveform 19 is greater than zero and negative when input waveform 19 is less than zero.

Component 23 functions either as an inverter or a buffer depending on the polarity of waveform 21a at the output of comparator 21. When the output of comparator 21 is low, (i.e. below zero), switch 24 is closed grounding input 23a of inverter/buffer 23 thereby causing it to function as an inverter. When the output of comparator 21 is high (i.e. positive), switch 24 is open allowing input 23a to float and thus follow the output of buffer 20 thereby causing component 23 to function as a buffer. Thus, inverter/buffer 23 converts the triangular waveform 22 into a sawtooth waveform 25 at double the frequency of triangular waveform 22.

Summer 26 provides a linear, positive going, ramp waveform 30 (depicted in FIG. 2f), by taking the algebraic sum of the sawtooth output waveform 25 of inverter/buffer 23 plus the constant positive shift provided via resistor 28 and voltage source −V, equalling one half of the absolute magnitude of the sawtooth output waveform 25 plus the switched positive shift provided via resistor 29 and voltage source −V equalling the absolute magnitude of the sawtooth output waveform 25 of inverter/buffer 23 whenever the output of comparator 21 is low, closing switch 27. The resistor 29 is brought into the circuit to supply a source −V to summer 26 when the switch 27 is closed by a low (i.e., below zero) output from the comparator 21, and is taken out of the circuit when the switch 27 is opened by high a (i.e, positive) output from the comparator.

The linear positive going ramp waveform 30 may be coupled to a variety of conventional voltage measuring instruments such as a digital voltmeter.

It will be appreciated that switches 24 and 27 may be implemented using conventional chopper transistors or field effect transistors such that when waveform 21a is negative (low) the transistors implementing switches 24 and 27 conduct, thereby closing the switches.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Apparatus to convert angular position to linear voltage comprising:
    angular position means for generating a first and second cyclical voltage waveform, said waveforms being disposed at a predetermined angular separation from one another,
    waveform converting means for receiving said first and second cyclical waveforms and for providing therefrom a waveform that is an inverted representation of said first cyclical voltage waveform when said second cyclical voltage waveform is negative and a direct representation of said first cyclical waveform when said second cyclical waveform is positive, and
    means for summing output of said waveform converting means and a predetermined d.c. voltage for providing a linear positive going ramp waveform representative of said angular position voltage generating means.

2. Apparatus according to claim 1 wherein said angular position means comprises:

continuous element dual wiper potentiometer, said dual wipers being separated by a predetermined angle.

3. Apparatus according to claim 2 wherein said first and second cyclical voltages are triangular waveforms out of phase with each other by said predetermined angle.

4. Apparatus according to claim 3 wherein said predetermined angle is 90 degrees.

5. Apparatus according to claim 2 wherein said waveform converting means comprises:
 a buffer coupled to a first wiper of said dual wiper potentiometer for receiving said first cyclical waveform,
 an inverter/buffer adapted to receive output of said buffer,
 a comparator coupled to receive said second cyclical waveform,
 a switch activated by output of said comparator, said switch connects a first input lead of said inverter/buffer to ground when activated by said comparator, said inverter/buffer operating as an inverter when said first input lead is connected to ground by said switch and as a buffer when said first input lead is not connected to ground.

6. Apparatus according to claim 5 wherein said switch comprises a transistor such that a negative output of said comparator causes said first input lead to be connected to ground.

7. Apparatus according to claim 1 wherein said summing means comprises
 an operational amplifier for summing a constant voltage and a periodic voltage and output of said waveform converting means to provide said positive going ramp waveform.

8. Apparatus according to claim 5, wherein said waveform converting means comprises a further switch coupled to be activated by said output of said comparator for providing a predetermined constant voltage to said means for summing when periodically energized by said comparator.

* * * * *